United States Patent
Kamei et al.

(10) Patent No.: US 7,443,081 B2
(45) Date of Patent: Oct. 28, 2008

(54) MULTI-FREQUENCY TRANSMISSION/RECEPTION APPARATUS

(75) Inventors: Kazuhiko Kamei, Kobe (JP); Ryouichi Suetoshi, Amagasaki (JP); Takeharu Yamaguchi, Nishinomiya (JP)

(73) Assignee: Furuno Electric Company, Limited, Nishinomiya Hyogo (JP)

( * ) Notice: Subject to any disclaimer, the term of this patent is extended or adjusted under 35 U.S.C. 154(b) by 70 days.

(21) Appl. No.: 10/471,700

(22) PCT Filed: Apr. 11, 2002

(86) PCT No.: PCT/JP02/03635

§ 371 (c)(1), (2), (4) Date: Sep. 15, 2003

(87) PCT Pub. No.: WO02/087280

PCT Pub. Date: Oct. 31, 2002

(65) Prior Publication Data

US 2004/0090148 A1 May 13, 2004

(30) Foreign Application Priority Data

Apr. 13, 2001 (JP) .......................... 2001-116207

(51) Int. Cl.
H01L 41/08 (2006.01)
(52) U.S. Cl. ..................................................... 310/334
(58) Field of Classification Search ................. 310/322, 310/334, 333
See application file for complete search history.

(56) References Cited

U.S. PATENT DOCUMENTS

| | | | | |
|---|---|---|---|---|
| 2,943,297 A | * | 6/1960 | Steinberger et al. ......... | 367/155 |
| 4,090,204 A | * | 5/1978 | Farhat ........................ | 343/754 |
| 4,211,949 A | * | 7/1980 | Brisken et al. .............. | 310/322 |
| 4,242,912 A | * | 1/1981 | Burckhardt et al. .......... | 73/626 |
| 4,305,014 A | * | 12/1981 | Borburgh et al. ............ | 310/334 |
| 4,310,957 A | * | 1/1982 | Sachs ........................ | 29/25.35 |
| 4,460,841 A | * | 7/1984 | Smith et al. .................. | 310/334 |
| 4,736,132 A | * | 4/1988 | Culp .......................... | 310/333 |
| 5,091,893 A | * | 2/1992 | Smith et al. .................. | 367/153 |
| 5,099,459 A | * | 3/1992 | Smith ........................ | 367/153 |
| 5,187,403 A | * | 2/1993 | Larson, III .................. | 310/334 |
| 5,247,222 A | * | 9/1993 | Engle ........................ | 310/328 |

(Continued)

FOREIGN PATENT DOCUMENTS

JP          56-91599 A          7/1981

(Continued)

*Primary Examiner*—Thomas M Dougherty
(74) *Attorney, Agent, or Firm*—Birch, Stewart, Kolasch & Birch, LLP

(57) ABSTRACT

The invention provides a multi-frequency transducer capable of obtaining desired directivity regardless of frequencies. Parallelepiped-shaped transducer elements (1) are used as transducer elements and a plurality of such transducer elements (1) are arranged in an array. The transducer elements (1) are caused to resonate using a resonant frequency in fundamental vibration mode and a resonant frequency in harmonic vibration mode determined by the dimensions (A, B) of a short edge (1a) and a long edge (1b) perpendicular to a longitudinal edge (1c) of each transducer element (1) to transmit and receive at multiple frequencies. The angle of directivity (θ) of the transducer elements is controlled by the dimension (C) of the longitudinal edge which is set to a value which does not affect resonance in either the fundamental vibration mode or the harmonic vibration mode.

5 Claims, 7 Drawing Sheets

U.S. PATENT DOCUMENTS

| | | | |
|---|---|---|---|
| 5,581,517 A * | 12/1996 | Gee et al. | 367/138 |
| 5,706,252 A * | 1/1998 | Le Verrier et al. | 367/152 |
| 5,938,612 A * | 8/1999 | Kline-Schoder et al. | 600/459 |
| 6,068,597 A * | 5/2000 | Lin | 600/443 |
| 6,176,829 B1 * | 1/2001 | Vilkomerson | 600/443 |
| 6,222,303 B1 * | 4/2001 | Nakamura et al. | 310/328 |
| 6,278,223 B1 * | 8/2001 | Sasaki et al. | 310/328 |
| 6,288,477 B1 * | 9/2001 | Gilmore et al. | 310/334 |
| 6,384,516 B1 * | 5/2002 | Fraser | 310/334 |
| 6,558,331 B1 * | 5/2003 | Davidsen et al. | 600/459 |
| 6,574,028 B2 * | 6/2003 | Esener et al. | 359/254 |
| 2002/0140318 A1 * | 10/2002 | Takeuchi et al. | 310/320 |
| 2002/0171331 A1 * | 11/2002 | Puskas | 310/328 |
| 2003/0055337 A1 * | 3/2003 | Lin | 600/459 |
| 2004/0070315 A1 * | 4/2004 | Takeuchi et al. | 310/334 |
| 2005/0099096 A1 * | 5/2005 | Baumgartner et al. | 310/334 |

FOREIGN PATENT DOCUMENTS

| | | |
|---|---|---|
| JP | 63-181600 A | 7/1988 |
| JP | 10-192277 A | 7/1998 |

* cited by examiner

DIMENSION A/DIMENSION B 0.3
WITHOUT COMBINATION VIBRATION

DIMENSION A/DIMENSION B 0.6
WITH COMBINATION VIBRATION

MULTI-FREQUENCY TRANSMISSION/RECEPTION APPARATUS

This application is the national phase under 35 U.S.C. §371 of PCT International Application No. PCT/JP02/03635 which has an International filing date of Apr. 11, 2002, which designated the United States of America.

TECHNICAL FIELD

The present invention relates to a multi-frequency transducer used in a fish-finding echo-sounder or a sonar and, in particular, to a multi-frequency transducer including a plurality of parallelepiped-shaped transducer elements arranged in an array.

BACKGROUND ART

A multi-frequency transducer is a type of transducer which is operated on a frequency selected in accordance with targets of search. This type of transducer is used in underwater sounding apparatus, such echo-sounders and sonars. A typical example of the multi-frequency transducer is a two-frequency transducer which is designed to transmit and receive ultrasonic waves at either of two frequencies. Although the two-frequency transducer of this kind may be provided with two transducer elements designed to operate independently of each other on two frequencies, this approach results in an increase in the overall physical size and cost of the transducer. In this situation, a transducer capable of transmitting and receiving ultrasonic waves at two frequencies with a single transducer element is currently available for practical use.

A transducer 100 shown in FIG. 11 has conventionally been used as the aforementioned kind of transducer. The transducer 100 is constructed of a piezoelectric ceramic material (PZT), for example, which is shaped into a circular disc having a diameter L1 and a thickness L2. This transducer 100 has a natural resonant frequency f1 determined by the value L1 as well as a natural resonant frequency f2 determined by the value L2, wherein there is a relationship f1<f2 between the two resonant frequencies because L1>L2. Therefore, if a transmit signal of which frequency is equal to one of the two resonant frequencies f1, f2 is introduced into the transducer 100, it resonates at the applied frequency and radiates ultrasonic waves at the frequency f1 or f2 whichever applied. When receiving echo signals reflected back from underwater objects, the transducer 100 resonates again at the frequency f1 or f2, whichever applied, and produces a receive signal at that frequency. It is possible to transmit and receive ultrasonic waves at the two frequencies with this single-element transducer 100.

However, the transducer 100 has only two distinct dimensions, L1 and L2, since it is shaped into a circular disc. The values L1 and L2 are uniquely determined when the resonant frequencies are determined. On the other hand, the aforementioned disc-shaped transducer 100 normally radiates ultrasonic waves from its circular surfaces, so that the angle of directivity of the transducer 100 is determined by its dimension L1. Since the values L1 and L2 are determined by the resonant frequencies, it is impossible to freely select the angle of directivity as a function of the value L1. Thus, the dimensions and the angle of directivity of the conventional transducer are not mutually independent. Since the angle of directivity is automatically determined when the resonant frequency is determined, it has been impossible to obtain a desired angle of directivity.

This invention has been made in light of the aforementioned problems. Accordingly, it is an object of the invention to provide a multi-frequency transducer of which dimensions and angle of directivity are made mutually independent so that a desired angle of directivity can be obtained regardless of frequencies.

DISCLOSURE OF THE INVENTION

To solve the aforementioned problems, parallelepiped-shaped transducer elements are used as transducer elements and a plurality of such transducer elements are arranged in an array in the present invention. The transducer elements are caused to resonate at a resonant frequency in fundamental vibration mode and at a resonant frequency in harmonic vibration mode determined by the dimensions of two edges of each transducer element perpendicular to a longitudinal edge of each transducer element to transmit and receive at multiple frequencies. The longitudinal edge is set to a dimension which does not affect resonance in either the fundamental vibration mode or the harmonic vibration mode, and the angle of directivity of the transducer elements is controlled by the dimension of the longitudinal edge.

Since there are three dimensions when such parallelepiped-shaped transducer elements of the invention are used, it is possible to freely determine one dimension even when two dimensions have been determined according to resonant frequencies. This makes it possible to select the angle of directivity by varying that dimension regardless of the resonant frequencies. While harmonic vibration modes include third harmonic vibration mode, fifth harmonic vibration mode, and so on, the expressions third harmonic vibration mode, fifth harmonic vibration mode, etc. as used in this Description are not limited in the strict sense to the third harmonic vibration mode, fifth harmonic vibration mode, etc. defined in physics but imply broader concepts including approximate third harmonic vibration mode, approximate fifth harmonic vibration mode, etc.

BEST MODES FOR CARRYING OUT THE INVENTION

Figure 1:
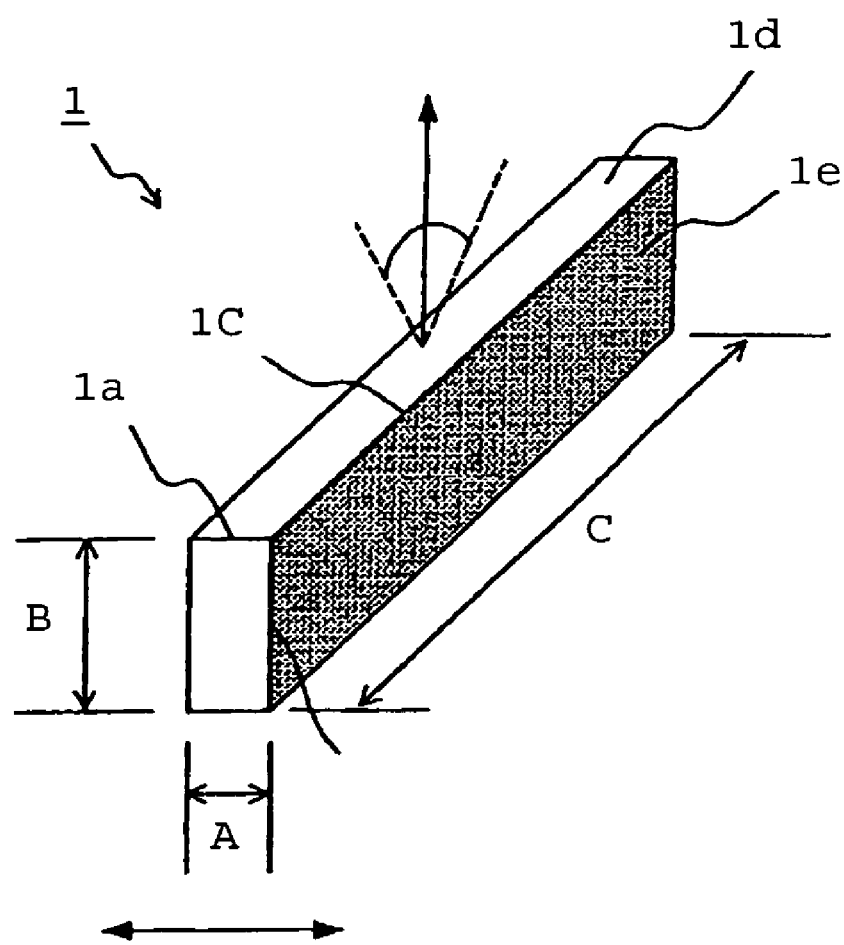
FIG. 1 is a perspective view of a parallelepiped-shaped transducer element used in a multi-frequency transducer of the present invention.

FIG. 1 is a perspective diagram showing an example of a parallelepiped-shaped transducer element used in a multi-frequency transducer of the invention. Constructed of a piezoelectric ceramic material (PZT), for example, the parallelepiped-shaped transducer element 1 is formed into a rectangular parallelepiped shape the lengths of which three edges are A, B and C, wherein "A" is the dimension of short edges 1a, "B" is the dimension of long edges 1b and "C" is the dimension of longitudinal edges 1c. Designated by 1d is a radiating surface for radiating ultrasonic waves defined by the edges 1a and 1c. The ultrasonic waves are radiated from this radiating surface 1d in a direction shown by an arrow in the Figure. Indicated by θ is the angle of directivity of the transmitted waves. Designated by 1e is a pair of electrode surfaces defined by the edges 1b and 1c that are located on opposite sides of the short edges 1a. (FIG. 1 shows one of the electrode surfaces 1e only.) Lead wires (which will be described later) for applying a voltage to the parallelepiped-shaped transducer element 1 in each transmit cycle and for taking out a voltage from the parallelepiped-shaped transducer element 1 in each receive cycle are connected to these electrode surfaces 1e. The direction of polarization of the parallelepiped-shaped transducer element 1 is parallel to the short edges 1a as illustrated.

Figure 2:
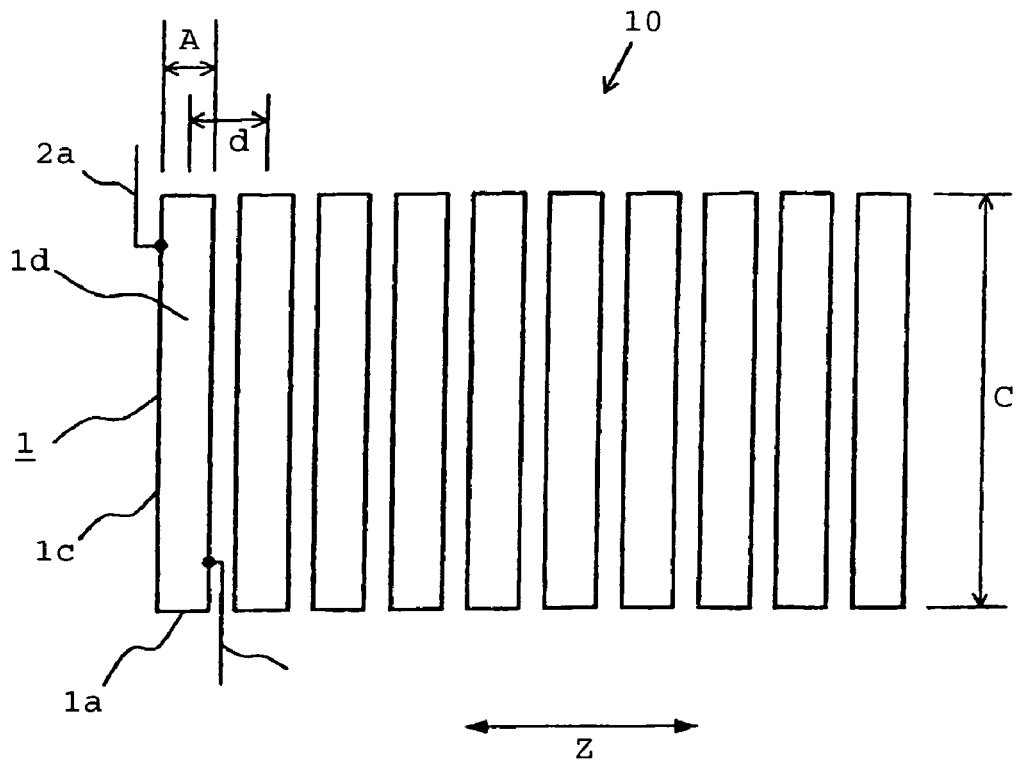
FIG. 2 is a plan view of the multi-frequency transducer employing parallelepiped-shaped transducer elements.
Figure 3:
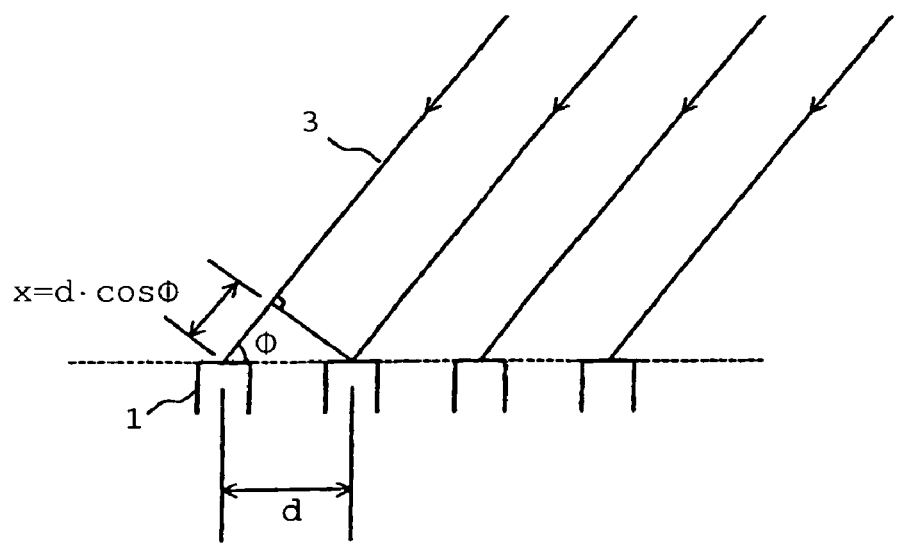
FIG. 3 is a diagram for explaining a grating lobe.

FIG. 2 is a plan view of the multi-frequency transducer employing the aforementioned parallelepiped-shaped transducer element 1. The multi-frequency transducer 10 is constructed of a transducer array in which a plurality of parallelepiped-shaped transducer elements 1 are arranged side by side. The individual parallelepiped-shaped transducer elements 1 are arranged in such a manner that the direction of their short edges 1a coincides with an array direction Z in which the transducer elements are arranged. The letter "d" in the Figure represents the interval (center-to-center distance) between the parallelepiped-shaped transducer elements 1. Designated by 2a and 2b are the aforementioned lead wires which are electrically connected to the electrode surfaces 1e (refer to FIG. 1) of the parallelepiped-shaped transducer element 1. While the lead wires 2a, 2b are shown for the parallelepiped-shaped transducer element 1 at the extreme left end only in the Figure, the lead wires 2a, 2b are also connected to the other parallelepiped-shaped transducer elements 1 in the same fashion.

In the array-type transducer shown in FIG. 2, the array element interval d between the successive parallelepiped-shaped transducer elements 1 is an important factor for determining directional characteristics. It is therefore necessary to properly select the array element interval d. Specifically, when the parallelepiped-shaped transducer elements 1 are operated with signals of the same phase, ultrasonic waves 3 incident from an oblique direction (angle φ) to the individual parallelepiped-shaped transducer elements 1 arranged at the array element interval d arrive with a phase difference corresponding to a distance x=d·cos φ between the adjacent transducer elements 1. Thus, when the array element interval d is large, there exists a value of φ at which the value x becomes an integer multiple of the wavelength λ of the ultrasonic waves. The ultrasonic waves 3 incident at this angle φ are all matched in phase when they arrive at the individual transducer elements 1 and, therefore, the transducer produces a high received voltage level at that incident angle φ. Since there exists the angle φ of the oblique direction other than the frontal direction (φ=90°) at which the incident ultrasonic waves are matched in phase as seen above, there occurs a maximum point of sensitivity (grating lobe; hereinafter referred to as GL) which leads to a deterioration in S/N ratio with respect to the directional characteristics.

To avoid the aforementioned problem, it is preferable to make the array element interval d smaller than the wavelength λ of the ultrasonic waves. Specifically, because the maximum value of cos φ is 1, λ becomes smaller than the value x and x does not become an integer multiple of λ if d is smaller than λ. If the array element interval of the parallelepiped-shaped transducer elements 1 is d (mm), the used frequency is f (kHz), and the sound velocity through a propagation medium is v (m/s), the wavelength λ (mm) is expressed by λ=v/f. Thus, to avoid the occurrence of GL for ultrasonic waves incident from an oblique direction, the parallelepiped-shaped transducer elements 1 should be arranged such that the array element interval d satisfies the following relationship:

$$d < v/f \qquad (1)$$

Assuming that no sound insulator is provided between the individual transducer elements, the array element interval d can be regarded as being equal to the dimension A of the short edge 1a, so that inequality (1) above can be rewritten as follows:

$$A < v/f$$

Transforming this inequality, we obtain $$A \cdot f < v \qquad (2)$$

Inequality (2) above gives a condition for not causing GL to occur. If the propagation medium is water, the underwater sound velocity is v=1500. Substituting this into inequality (2), we obtain $$A \cdot f < 1500 \qquad (3)$$

It is possible to avoid the occurrence of GL if the transducer array as illustrated in FIG. 2 is configured with the dimension A of the short edges 1a of the parallelepiped-shaped transducer elements 1 so selected as to satisfy inequality (3) above. For the convenience of later explanation, A·f of inequalities (2) and (3) is referred to as an array constant which is hereby defined as follows:

$$N = A \cdot f$$

Since the parallelepiped-shaped transducer elements 1 are arranged such that the direction of their short edges 1a coincides with the array direction Z in FIG. 2, it is possible to limit the overall array length in the array direction Z in which multiple transducer elements are arranged. Also, as can be recognized from FIG. 1, each electrode surface 1e is a surface having the largest area defined by the longitudinal edges 1c and the long edges 1b, so that the impedance of the transducer elements can be reduced. Since the electrode surfaces 1e are surfaces perpendicular to the radiating surface 1d and oriented sideways, the lead wires 2a, 2b can be easily connected. Furthermore, the radiating surface 1d for radiating the ultrasonic waves extends in the longitudinal direction of each transducer element. As will be described later, the dimension C in the longitudinal direction does not influence the resonant frequency of the transducer element, so that it is possible to control its directivity independently. Based on the foregoing, it is most effective and desirable to arrange the parallelepiped-shaped transducer elements 1 of FIG. 1 in a manner illustrated in FIG. 2.

Next, resonance characteristics of the parallelepiped-shaped transducer elements 1 that constitute a characteristic feature of the invention are described.

The parallelepiped-shaped transducer element 1 shown in FIG. 1 has three dimensions A, B and C and, accordingly, has natural resonant frequencies corresponding to the individual lengths. In this invention, multiple frequencies are obtained by use of the individual resonant frequencies in fundamental vibration modes and harmonic vibration modes determined by the dimension A of the short edge and the dimension B of the long edge, and the angle of directivity θ is controlled by the longitudinal dimension C. A specific embodiment given below is an example of a two-frequency system.

Referring to FIG. 1, the dimension A of the short edge and the dimension B of the long edge of the parallelepiped-shaped transducer element 1 are set to have a dimension ratio, such as A/B=0.1, which will not produce later-described combination vibration. Also, the longitudinal dimension C is set to a value which will not influence resonance in either the fundamental vibration mode or harmonic vibration mode, such as to satisfy C>3B.

Figure 4:
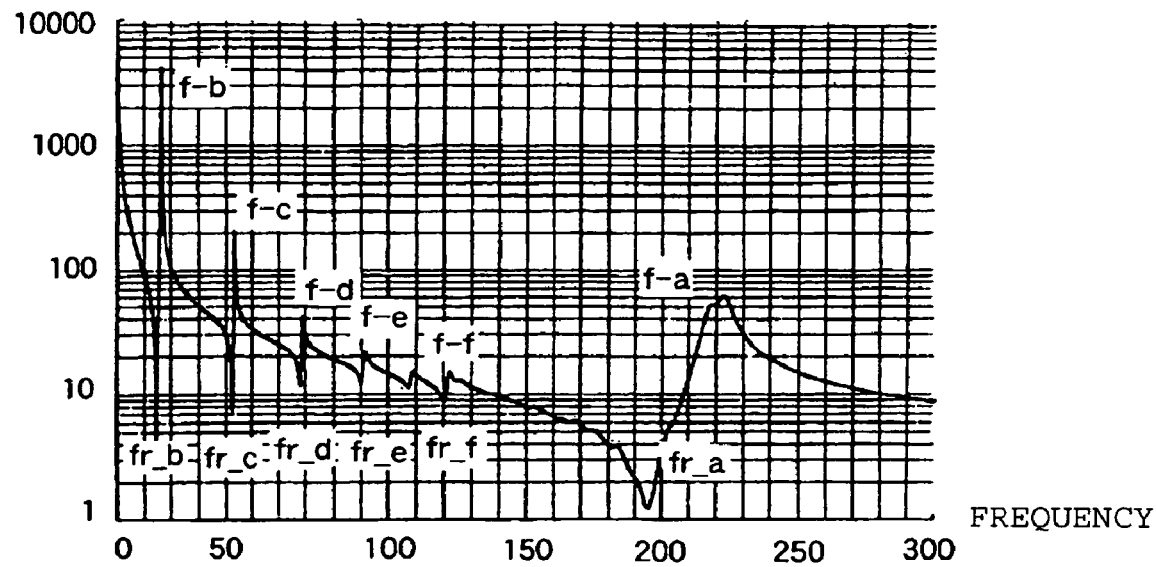
FIG. 4 shows an example of resonance characteristics of the parallelepiped-shaped transducer element.

FIG. 4 shows an example of resonance characteristics of such the parallelepiped-shaped transducer element 1, in which the horizontal axis represents the frequency of a signal applied to the parallelepiped-shaped transducer element 1 and the vertical axis represents the absolute value of the impedance of the transducer element. f-a, f-b, . . . , f-f represent vibration modes and fr_a, fr_b, . . . , fr_f represent resonant frequencies in the individual vibration modes. Among these vibration modes, f-a and f-b are fundamental vibration modes determined by the dimension A of the short edge and the dimension B of the long edge, respectively, and f-c, f-d, f-e and f-f are harmonic vibration modes. It is to be noted that although resonance in the fundamental vibration mode determined by the longitudinal dimension C of the transducer element appears at a frequency lower than fr_b, this resonance is omitted in FIG. 4.

The parallelepiped-shaped transducer element 1 has the resonant frequencies not only in the fundamental vibration modes but also in the harmonic vibration modes as seen above. Therefore, it is possible to realize a two-frequency transducer by using the resonant frequency fr_b in the fundamental vibration mode f-b and the resonant frequency fr_c in the third harmonic vibration mode f-c, for example. Specifically, if a transmit signal of the frequency fr_b and a transmit signal of the frequency fr_c are alternately applied to each parallelepiped-shaped transducer element 1 of FIG. 2 through the lead wires 2a, 2b, the transducer elements resonate at the frequency fr_b or fr_c and radiate ultrasonic waves underwater at the relevant frequency. When receiving echo signals reflected back from underwater objects, the transducer elements resonate again at the frequency fr_b or fr_c and produces a receive signal at the relevant frequency.

While there exists the fundamental vibration mode f-a determined by the dimension A besides the fundamental vibration mode f-b determined by the dimension B, the resonant frequency fr_a in the fundamental vibration mode f-a can not be used because it does not satisfy the aforementioned condition concerning the array constant (inequality (3)). Also, although there exist the fifth harmonic vibration mode f-d, the seventh harmonic vibration mode f-e, and so on besides the third harmonic vibration mode f-c, a usable range of the fifth harmonic vibration mode f-d is limited and seventh and higher harmonic vibration modes can not be used due to restrictions imposed by the condition concerning the array constant. This is further described in the following.

Figure 5:
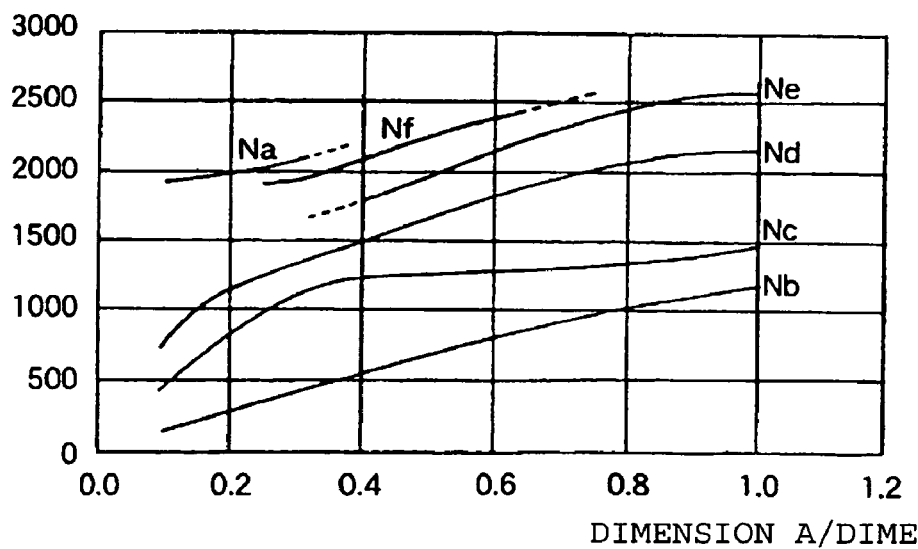
FIG. 5 is a graph showing the relationship between a dimension ratio and array constants.

FIG. 5 is a graph showing the relationship between the value of A/B and the array constant, in which Na, Nb, . . . , Nf represent array constants corresponding to the individual vibration modes f-a, f-b, . . . , f-f. Since the array constant is defined by the equation N=A·f as previously mentioned, the individual array constants Na, Nb, . . . , Nf are given by calculating products of the dimension A of the short edge of the transducer element and its resonant frequencies fr_a, fr_b, . . . , fr_f.

As will be recognized from FIG. 5, the array constant Nb of the fundamental vibration mode f-b does not exceed 1500 even if A/B varies within a range of 0.1 to 1.0. This means that the array constant Nb satisfies the condition of inequality (3) for not causing GL to occur. Similarly, the array constant Nc of the third harmonic vibration mode f-c does not exceed 1500 if A/B falls within the range of 0.1 to 1.0, so that the array constant Nc also satisfies the condition of inequality (3). Although the array constant Nd of the fifth harmonic vibration mode fd does not exceed 1500 if A/B falls within a range of 0.1 to 0.4, the array constant Nd exceeds 1500 and does not satisfy the condition of inequality (3) if A/B becomes equal to 0.4 or above. Further, the array constant Na of the fundamental vibration mode f-a and the array constants Ne, Nf of the seventh and higher harmonic vibration mode f-e, f-f exceed 1500 regardless of the value of A/B, so that the array constants Na, Ne, Nf do not satisfy the condition of inequality (3).

It is understood from the foregoing that the fundamental vibration mode f-b, the third harmonic vibration mode f-c, and part of the fifth harmonic vibration mode f-d satisfy the condition of inequality (3). Accordingly, a two-frequency transducer which does not produce GL is realized by using two frequencies, that is, the resonant frequency fr_b in the fundamental vibration mode f-b and the resonant frequency fr_c in the third harmonic vibration mode f-c in the aforementioned embodiment.

On the other hand, the angle of directivity θ can be regulated by varying the longitudinal dimension C of the transducer elements. Since the dimension C is set to a value which does not influence the resonant frequencies fr_b, fr_c in the fundamental vibration mode f-b and the third harmonic vibration mode f-c, it is possible to set the dimension C independently of the resonant frequencies. Specifically, although the dimensions A and B are restricted by the two resonant frequencies fr_b, fr_c, the dimension C is not restricted by the resonant frequencies fr_b, fr_c, so that the length can be freely determined. Consequently, the angle of directivity θ determined by the dimension C can be set independently of the resonant frequencies. While the angle of directivity θ is an angle of directivity along the longitudinal direction of each parallelepiped-shaped transducer element 1, an angle of directivity along the array direction Z (refer to FIG. 2) of the parallelepiped-shaped transducer elements 1 can be regulated by the number of the parallelepiped-shaped transducer elements 1 to be arranged, so that this angle of directivity is not restricted by the resonant frequencies either. Since the dimensions A, B and the dimension C can be determined mutually independently, it is possible to realize a transducer which permits a combination of desired resonant frequencies and desired angles of directivity.

Figure 6:
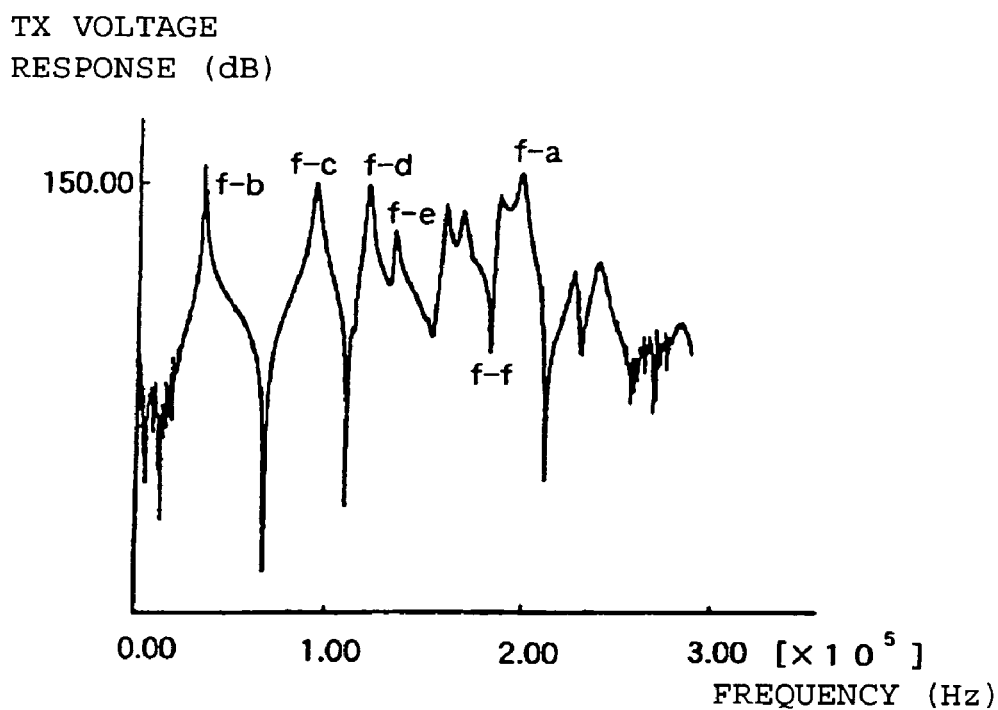
FIG. 6 is a graph showing frequency characteristics of transmitting voltage response.
Figure 7:
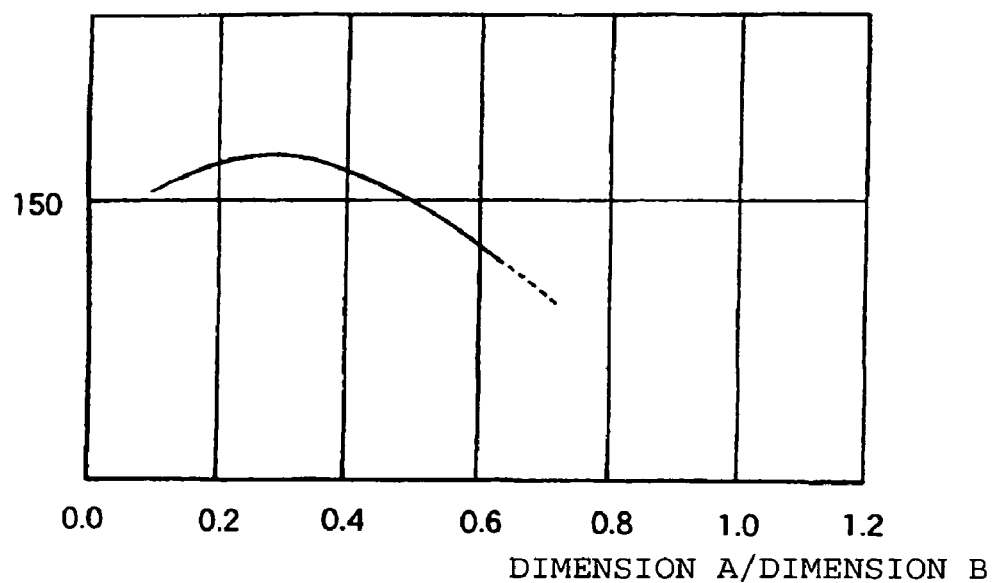
FIG. 7 is a graph showing the relationship between the dimension ratio and the transmitting voltage response.
Figure 8A:
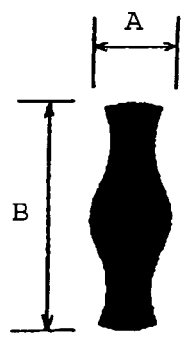
FIG. 8 is a diagram showing how the transducer element resonates in third harmonic vibration mode.
Figure 8A:
Figure 8B:
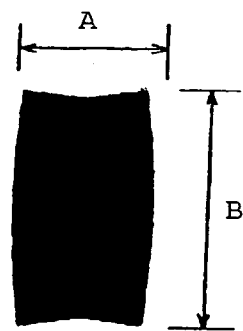
Figure 8B:
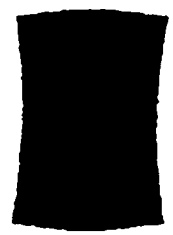

Shown in FIG. 6 is an example of transmitting voltage response in the individual vibration modes representing frequency characteristics of the transmitting voltage response on a central acoustic axis of the transducer. Whereas FIG. 6 shows the characteristics obtained when the value of A/B is fixed, FIG. 7 shows how the transmitting voltage response varies when the value of A/B is varied. Shown in FIG. 7 is the transmitting voltage response in the third harmonic vibration mode f-c. As can be seen from FIG. 7, the transmitting voltage response remains at 150 dB or above when the value of A/B is within a range of 0.1 to 0.5, whereas the transmitting voltage response becomes lower than 150 dB and sensitivity drops when the value of A/B exceeds 0.5. Practically, the characteristics are good enough for a two-frequency transducer if the transmitting voltage response is 150 dB or above and, therefore, it is preferable to set the value of A/B to 0.5 or below when using the third harmonic vibration mode f-c. It should however be noted that the value 0.5 is just one example. Generally, the value of A/B is set to a value equal to or smaller than a specific value which is predetermined based on the transmitting voltage response.

FIG. 8 is a diagram showing how the transducer element resonates in the third harmonic vibration mode f-c, in which (a) and (b) show how the transducer element resonates when A/B is 0.3 and 0.6, respectively. While vibration in clear third harmonic vibration mode is produced in (a), no vibration in harmonic vibration mode can be seen in (b). The vibration of (b) seems to be produced in combination vibration mode in which some vibration modes are combined. Vibrating efficiency is poor in this kind of combination vibration mode. A drop in the transmitting voltage response that occurs when the value of A/B exceeds 0.5 as shown in FIG. 7 is supposed to be caused by the occurrence of the combination vibration mode. Therefore, it is possible to prevent the occurrence of the aforementioned combination vibration mode by setting the dimension ratio A/B of the short edge to the long edge of each parallelepiped-shaped transducer element 1 to 0.5 or less.

Figure 9:
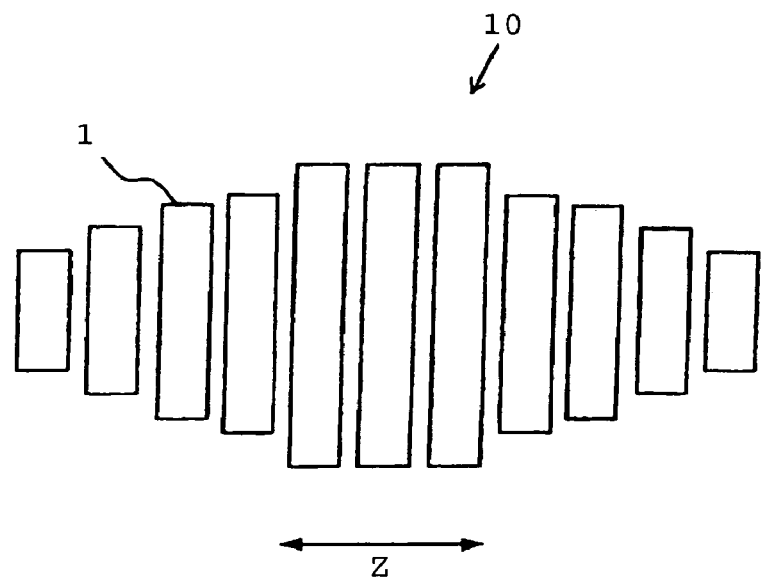
FIG. 9 is a plan view showing another embodiment of the present invention.

Shown in FIG. 9 is another embodiment of the present invention, in which an arrangement is made to avoid the occurrence of GL and suppress side lobes. In this embodiment, the longitudinal dimension of individual parallelepiped-shaped transducer elements 1 is successively varied along the array direction Z to assign them specific weights in the form of varying shapes. It is possible to control directivity of the transducer elements 1 in the array direction Z and suppress side lobes by assigning weights in this manner. Since the longitudinal dimension of the transducer elements 1 does not affect their resonant frequencies as stated earlier, it is possible to control the directivity and suppress side lobes regardless of the frequency by arranging the transducer elements 1 having varying dimensions as illustrated.

Figure 10:
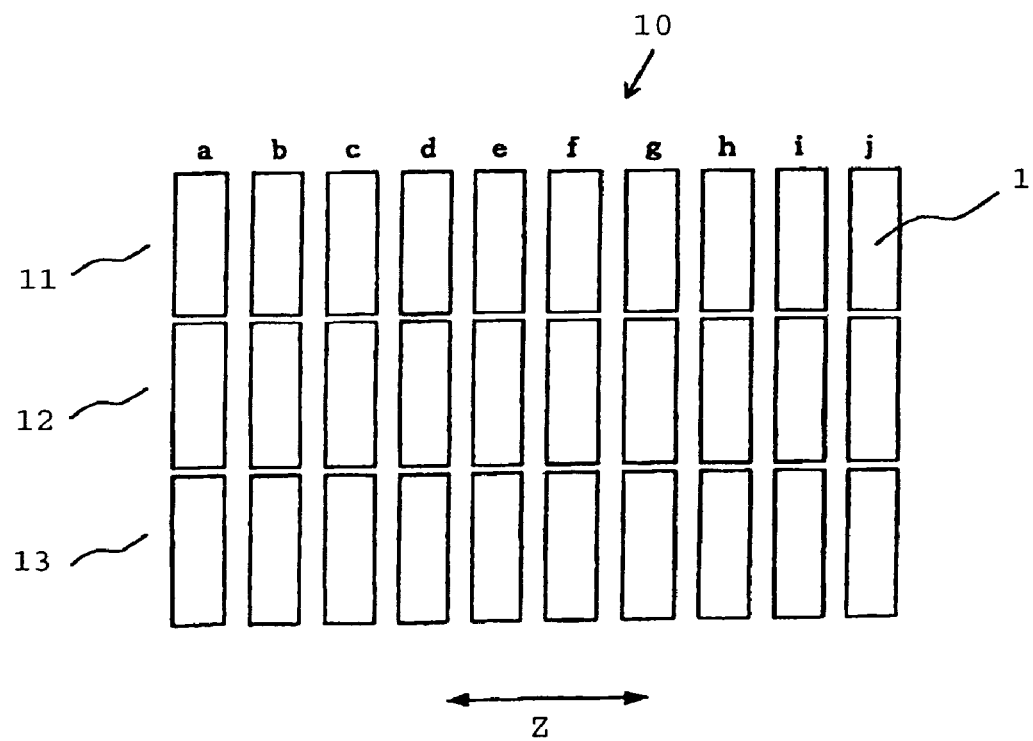
FIG. 10 is a plan view showing another embodiment of the present invention.
Figure 11:
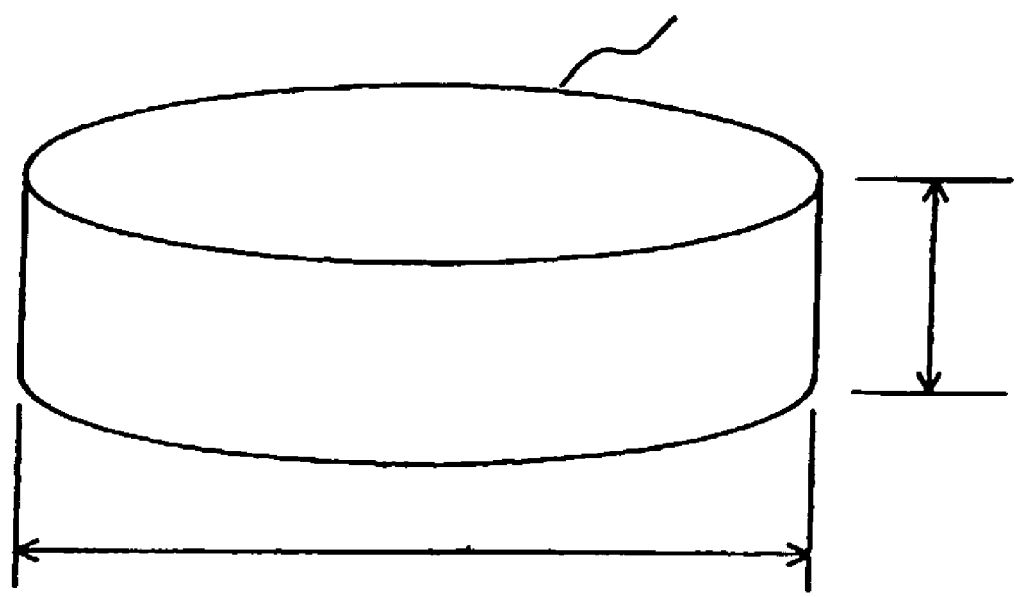
FIG. 11 is a perspective view showing a conventional transducer.

Weights can be assigned either by the aforementioned arrangement of varying shapes or by an electrical weighting method. FIG. 10 shows an embodiment employing this electrical weighting method, in which parallelepiped-shaped transducer elements 1 are divided in a direction perpendicular to the array direction Z so that there are provided a plurality of transducer arrays 11, 12, 13 each including an arrangement of multiple transducer elements. In this embodiment, the magnitude of voltage applied to the individual transducer arrays 11, 12, 13 is varied to weight the applied voltage. It is already known, as described in Japanese Unexamined Patent Publication No. H5-60858 and Japanese Examined Patent Publication No. H3-23874, for example, that the directivity can be improved by weighting the applied voltage by varying signal voltages applied to the transducer elements. Known methods can be used as means for weighting, such as a method of using the ratio of the numbers of windings of a transformer and a method of controlling the impedance of transducer elements. Also, functions such as Chebyshev's function and Gaussian function can be used as a weighting function. It is also possible to control the directivity along the array direction Z by weighting signal voltages with varying magnitudes that are applied to each longitudinally arranged set of transducer elements a, b, . . . , j shown in FIG. 10.

It is also possible in the construction of FIG. 2 to control the directivity along the array direction by weighting signal voltages with varying magnitudes that are applied to the individual parallelepiped-shaped transducer elements 1.

The present invention is not limited to the aforementioned embodiments alone but is applicable in various other forms. For example, while the examples of the two-frequency transducers using the fundamental vibration mode f-b and the third harmonic vibration mode f-c have been discussed in the aforementioned embodiments, it is also possible to realize a three-frequency transducer by using a resonant frequency determined by the longitudinal dimension C of the transducer elements. Furthermore, it is possible to utilize the fifth harmonic vibration mode f-d as a harmonic vibration mode within a specific range in addition to the third harmonic vibration mode f-c. This makes it possible to realize a four-frequency transducer.

Also, while the parallelepiped-shaped transducer elements 1 are constructed of the piezoelectric ceramic material (PZT) in the foregoing embodiments, any piezoelectric material, such as barium titanate, may be used as a material of the transducer elements. Since different materials have different sound velocities, it is needless to say that the value of A/B varies depending on the material used.

According to the present invention, it is possible to set the dimensions of parallelepiped-shaped transducer elements which determine their resonant frequencies and the dimension which determines their directivity independently of one another. This makes it possible to provide a multi-frequency transducer capable of realizing desired directional characteristics regardless of the frequency.

INDUSTRIAL APPLICABILITY

The present invention is applicable to a multi-frequency transducer used in a fish-finding echo-sounder or a sonar, for instance.

The invention claimed is:

1. An ultrasonic transducer array comprising:
a plurality of transducer elements, each transducer element further comprising:
a radiating surface;
two electrode surfaces coupled to the radiating surface, wherein transmit signals are applied to said electrode surfaces; and
an additional surface coupled to the two electrode surfaces, wherein each transducer element vibrates, in response to said transmit signals, at a predetermined plurality of resonant frequencies based upon dimensions of an edge of the radiating surface that is not in common with the electrode surface and an edge of the electrode surface that is not in common with the radiating surface, further wherein the dimensions are selected so that a combination vibration mode does not occur,
wherein the radiating surface transmits an acoustic wave resonating at the predetermined plurality of resonant frequencies and propagates with a predetermined angle of directivity, further wherein the angle of directivity is based upon a dimension of an edge common to the radiating surface and the electrode surface,
wherein the dimension of the edge common to the radiating surface and the electrode surface is set to be larger than at least the edge of the radiating surface that is not in common with the electrode surface, and the edge of the electrode surface that is not in common with the radiating surface, to a degree that does not influence resonance in either a fundamental vibration mode or a harmonic vibration mode,
wherein the transducer elements are arranged in an array so that each radiating surface lies in a common surface.

2. The ultrasonic transducer according to claim 1, further comprising an electrode attached to each electrode surface to energize the transducer element.

3. The ultrasonic transducer according to claim 1, wherein the ratio of the edge of the radiating surface not in common with the electrode surface and the edge of the electrode surface not in common with the radiating surface is less than 0.5.

4. The ultrasonic transducer according to claim 1, wherein each electrode surface of the plurality of transducer elements is energized by an AC signal.

5. The ultrasonic transducer according to claim 1, wherein the ratio of the edge common to the radiating surface and the electrode surface, and the edge of the electrode surface not in common with the radiating surface is larger than substantially 3.

* * * * *